United States Patent
Prakash et al.

(10) Patent No.: US 9,185,566 B2
(45) Date of Patent: Nov. 10, 2015

(54) CELL CANCELLATION LIST AND AN ADAPTIVE RADIO LINK FAILURE TRIGGER FOR IMPROVED SPECTRUM SHARING

(71) Applicant: QUALCOMM Incorporated, San Diego, CA (US)

(72) Inventors: Rajat Prakash, La Jolla, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 104 days.

(21) Appl. No.: 13/689,505

(22) Filed: Nov. 29, 2012

(65) Prior Publication Data

US 2013/0142116 A1 Jun. 6, 2013

Related U.S. Application Data

(60) Provisional application No. 61/565,619, filed on Dec. 1, 2011.

(51) Int. Cl.
*H04W 16/14* (2009.01)
*H04W 24/04* (2009.01)
*H04W 24/10* (2009.01)

(52) U.S. Cl.
CPC .............. *H04W 16/14* (2013.01); *H04W 24/04* (2013.01); *H04W 24/10* (2013.01)

(58) Field of Classification Search
CPC ............................... H04W 16/14; H04W 24/04
See application file for complete search history.

(56) References Cited

U.S. PATENT DOCUMENTS

| 2009/0092081 | A1* | 4/2009 | Balasubramanian et al. | 370/328 |
| 2010/0124172 | A1 | 5/2010 | Tenny et al. | |
| 2010/0278161 | A1 | 11/2010 | Ore et al. | |
| 2011/0242969 | A1 | 10/2011 | Dayal et al. | |
| 2011/0286346 | A1* | 11/2011 | Barbieri et al. | 370/252 |
| 2012/0082022 | A1 | 4/2012 | Damnjanovic et al. | |

(Continued)

FOREIGN PATENT DOCUMENTS

| EP | 0986279 A1 | 3/2000 |
| EP | 1006745 A1 | 6/2000 |

(Continued)

OTHER PUBLICATIONS

Dynamic Frequency-Intelligent Reserve-and-Switch Technique (D-FIRST) to Combat Inter-Operator Interference Beibei Wang, Chia-Chin Chong, Fujio Watanabe, K.J. Ray Liu IEEE—ICC 2008 proceedings.*

(Continued)

*Primary Examiner* — Charles C Jiang
*Assistant Examiner* — Thad Defauw
(74) *Attorney, Agent, or Firm* — Seyfarth Shaw LLP

(57) ABSTRACT

A cell cancellation method for improved spectrum sharing is provided. The cell cancellation method includes detecting interference from a cell. The method also includes cancelling a signal from the cell when a physical cell identifier corresponding to the cell is indicated in a cancellation list. An adaptive radio link failure (RLF) trigger method for improved spectrum sharing is disclosed. The RLF trigger method includes detecting interference from a cell. The RLF trigger method also includes adjusting a radio link failure trigger according to a cell identity of an interferer associated with the cell.

14 Claims, 11 Drawing Sheets

(56) References Cited

U.S. PATENT DOCUMENTS

| | | | |
|---|---|---|---|
| 2012/0087250 A1 | 4/2012 | Song et al. | |
| 2012/0149362 A1 | 6/2012 | Tooher et al. | |
| 2012/0207040 A1* | 8/2012 | Comsa et al. | 370/252 |
| 2012/0219155 A1* | 8/2012 | Drugge et al. | 380/287 |

FOREIGN PATENT DOCUMENTS

| | | |
|---|---|---|
| EP | 2387279 A1 | 11/2011 |
| EP | 2753037 A1 | 7/2014 |
| JP | 2010288282 A | 12/2010 |
| JP | 2014530551 A | 11/2014 |
| JP | 2014534765 A | 12/2014 |
| WO | 9959362 A1 | 11/1999 |
| WO | 2011130409 A1 | 10/2011 |
| WO | 2011130451 A1 | 10/2011 |
| WO | 2011159988 A1 | 12/2011 |
| WO | 2012047144 A1 | 4/2012 |
| WO | 2013044808 A1 | 4/2013 |
| WO | 2013064897 A1 | 5/2013 |

OTHER PUBLICATIONS

International Search Report and Written Opinion—PCT/US2012/067196—ISA/EPO—May 27, 2013.

LG Electronics: "Necessary Signalling and Air Interface Changes for Further Enhanced Non-CA-Based ICIC", 3GPP TSG-RAN WG1#67, R1-113977, Nov. 18, 2011, 6 Pages.

Partial International Search Report—PCT/US2012/067196—ISA/EPO—Jan. 23, 2013.

* cited by examiner

CELL CANCELLATION LIST AND AN ADAPTIVE RADIO LINK FAILURE TRIGGER FOR IMPROVED SPECTRUM SHARING

CROSS-REFERENCE TO RELATED APPLICATION

The present application claims the benefit of U.S. Provisional Patent Application No. 61/565,619 filed on Dec. 1, 2011, in the names of R. Prakash et al., the disclosure of which is expressly incorporated by reference herein in its entirety.

BACKGROUND

1. Field

Aspects of the present disclosure relate generally to wireless communication systems, and more particularly to cell cancellation and an adaptive radio link failure (RLF) trigger for improved spectrum sharing.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

As the demand for mobile broadband access continues to increase, the possibilities of interference and congested networks grows with more UEs accessing the long-range wireless communication networks and more short-range wireless systems being deployed in communities. Research and development continue to advance Universal Mobile Telecommunication System (UMTS) technologies not only to meet the growing demand for mobile broadband access, but to advance and enhance the user experience with mobile communications.

SUMMARY

In one aspect of the disclosure, a cell cancellation method for improved spectrum sharing is described. The cell cancellation method includes detecting interference from a cell. The method also includes cancelling a signal from the cell when a physical cell identifier corresponding to the cell is indicated in a cancellation list.

According to one aspect of the present disclosure, an apparatus for cell cancellation is described. The apparatus includes a memory and a processor(s) coupled to the memory. The processor(s) is configured to detect interference from a cell. The processor(s) is further configured to cancel a signal from the cell when a physical cell identifier corresponding to the cell is indicated in a cancellation list.

According to one aspect of the present disclosure, a computer program product for a cell cancellation system is described. The computer program product includes a computer readable medium having non-transitory program code recorded thereon. The program code includes program code to detect interference from a cell. The program code also includes program code to cancel a signal from the cell when a physical cell identifier corresponding to the cell is indicated in a cancellation list.

According to another aspect of the present disclosure, an apparatus of a cell cancellation system is described. The apparatus includes means for detecting interference from a cell. The apparatus also includes means for cancelling a signal from the cell when a physical cell identifier corresponding to the cell is indicated in a cancellation list.

In another aspect of the disclosure, an adaptive radio link failure (RLF) trigger method for improved spectrum sharing is described. The RLF trigger method includes detecting interference from a cell. The RLF trigger method also includes adjusting a radio link failure trigger according to a cell identity of an interferer associated with the cell.

According to one aspect of the present disclosure, an apparatus for an adaptive radio link failure (RLF) trigger is described. The apparatus includes a memory and a processor(s) coupled to the memory. The processor(s) is configured to detect interference from a cell. The processor(s) is further configured to adjust a radio link failure trigger according to a cell identity of an interferer associated with the cell.

According to one aspect of the present disclosure, a computer program product for an adaptive radio link failure (RLF) trigger is described. The computer program product includes a computer readable medium having non-transitory program code recorded thereon. The program code includes program code to detect interference from a cell. The program code also includes program code to adjust a radio link failure trigger according to a cell identity of an interferer associated with the cell.

According to another aspect of the present disclosure, an apparatus for an adaptive radio link failure (RLF) trigger is described. The apparatus includes means for detecting interference from a cell. The apparatus also includes means for adjusting a radio link failure trigger according to a cell identity of an interferer associated with the cell.

This has outlined, rather broadly, the features and technical advantages of the present disclosure in order that the detailed description that follows may be better understood. Additional features and advantages of the disclosure are described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
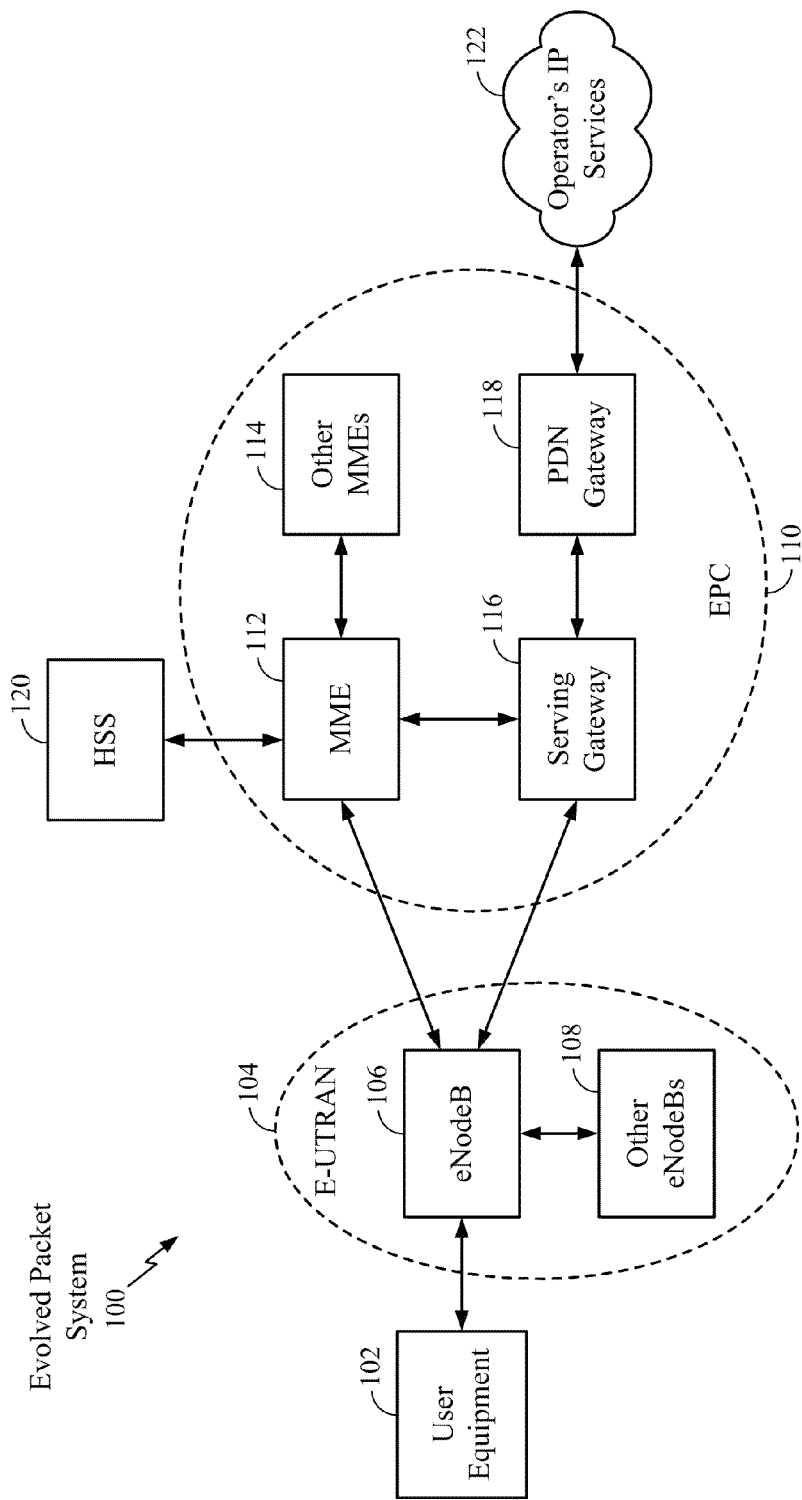
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100, in which cell cancellation and an adaptive radio link failure trigger may be implemented for providing improved spectrum sharing according to aspects of the present disclosure. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
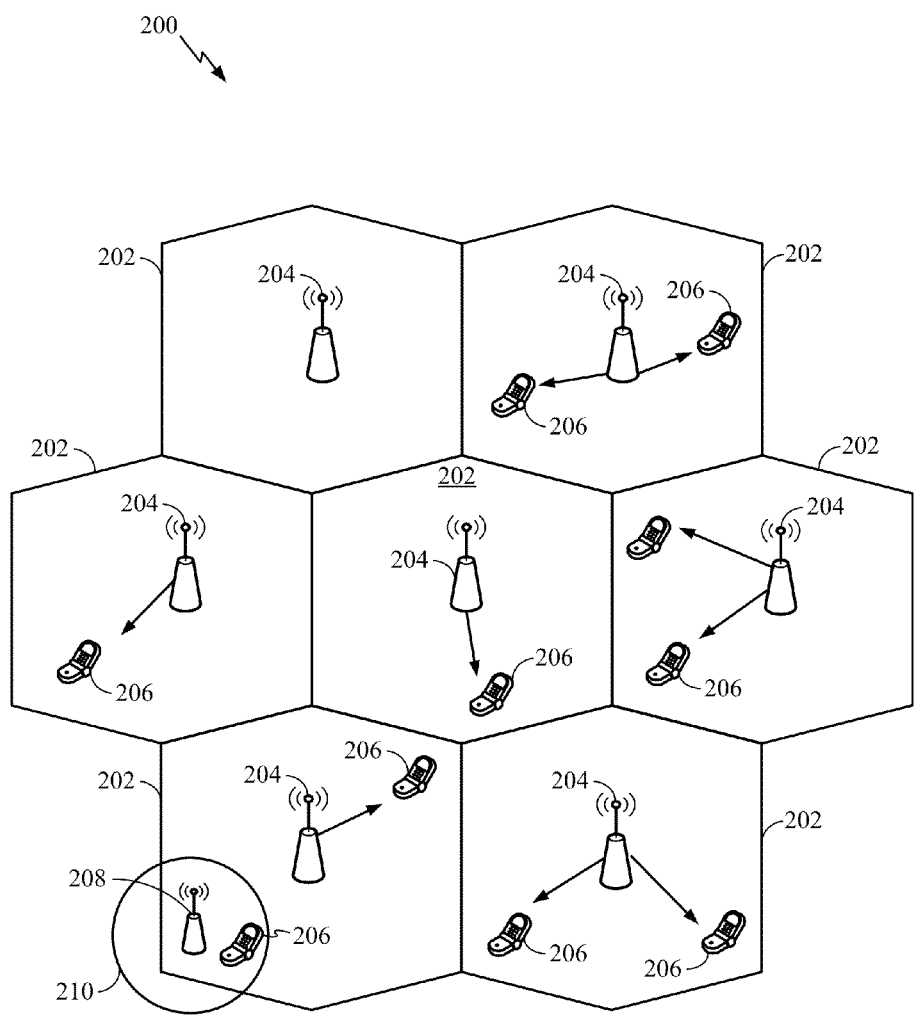
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective one of the cells 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeBs 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
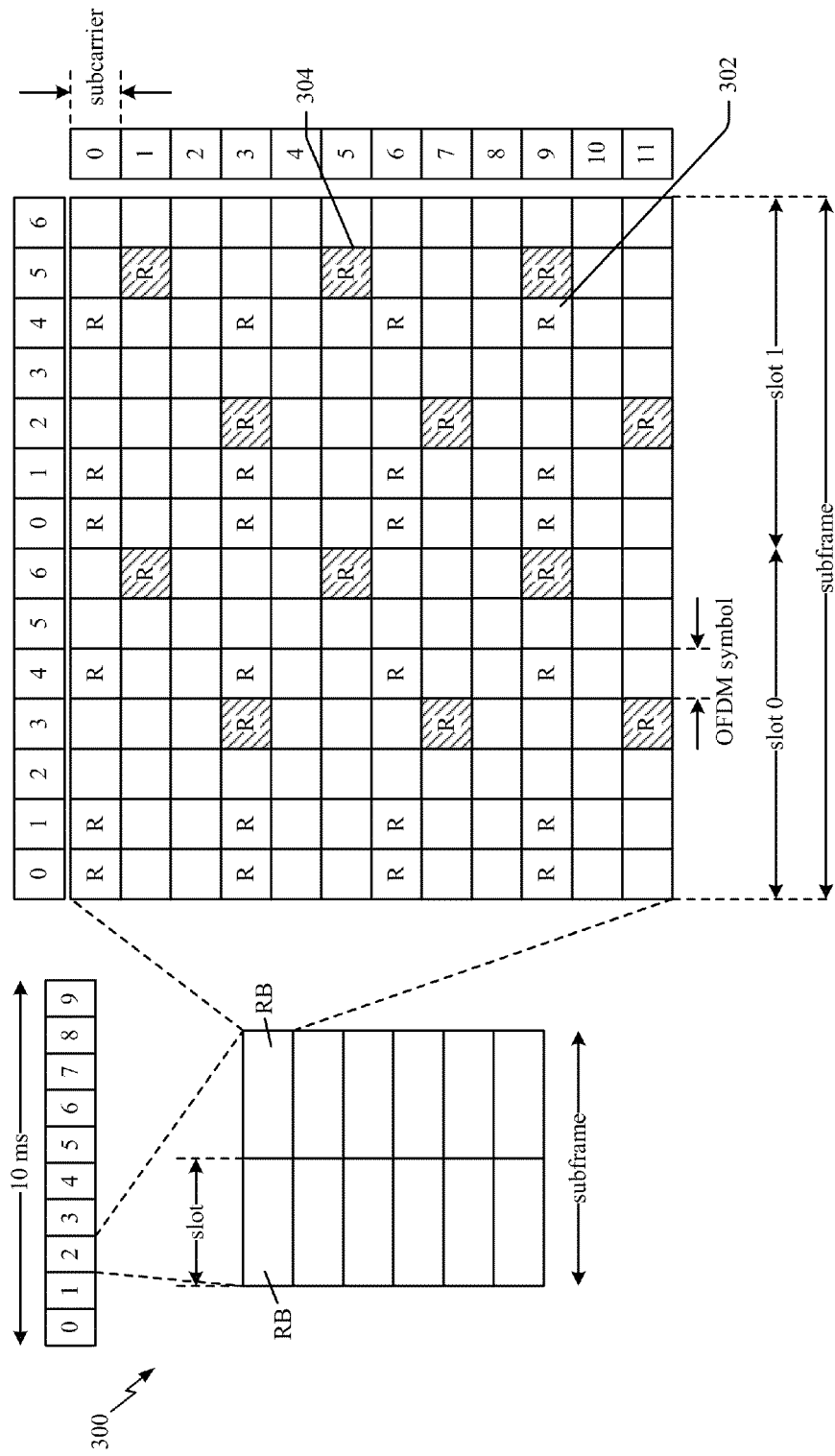
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme.

Thus, the more resource blocks that a UE receives and the higher the modulation scheme, the higher the data rate for the UE.

Figure 4:
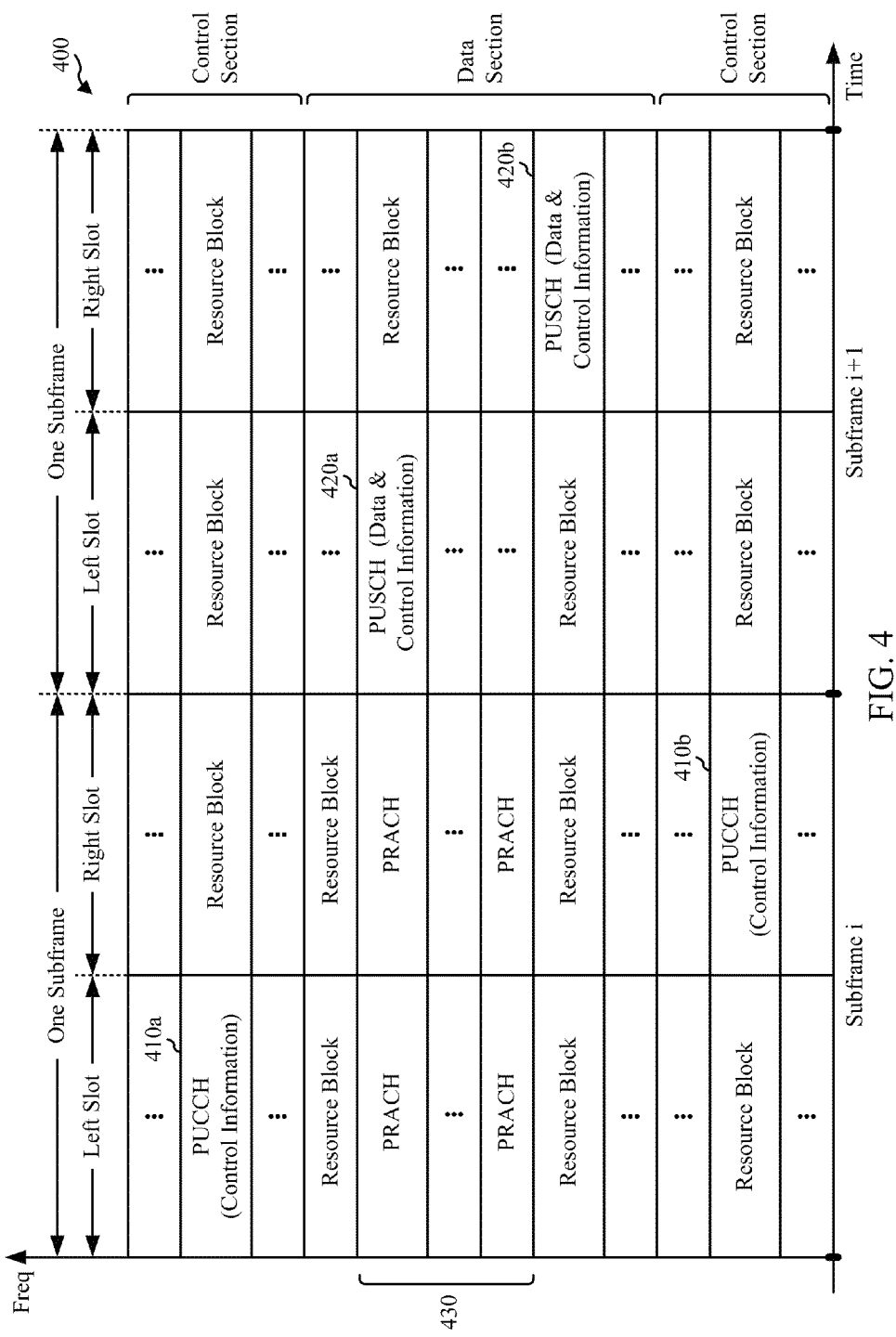
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
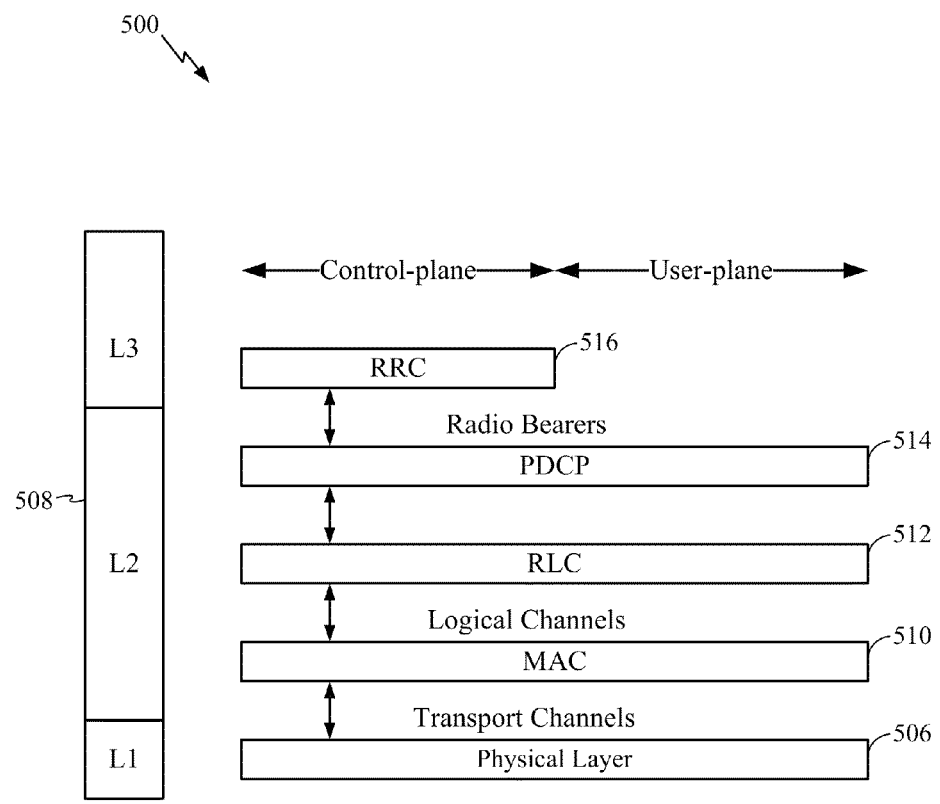
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
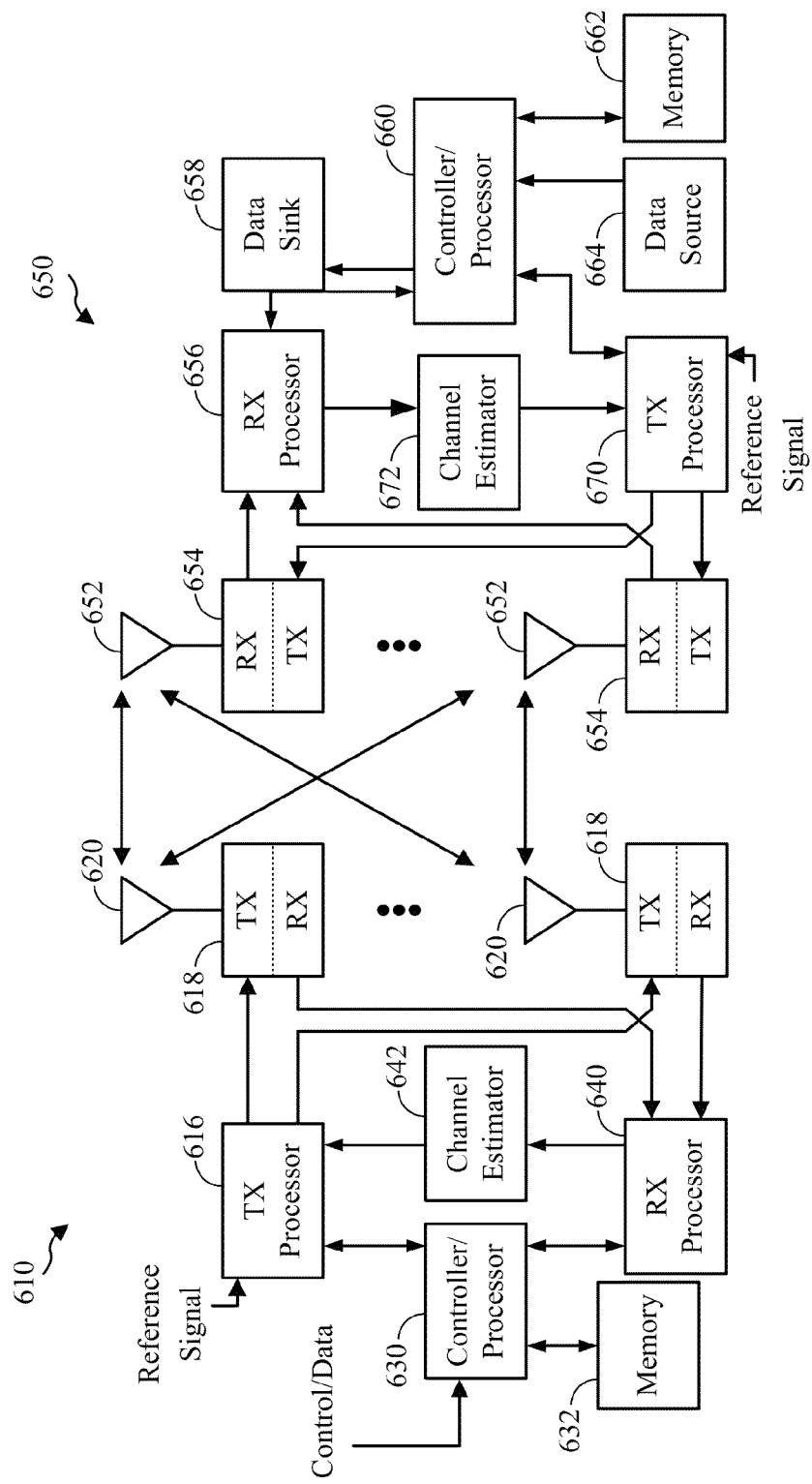
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor of the eNodeB 610. The controller/processor 630 implements the functionality of the L2 layer. In the downlink, the controller/processor 630 provides header compression, ciphering, packet segmentation and reordering, multiplexing between logical and transport channels, and radio resource allocations to the UE 650 based on various priority metrics. The controller/processor 630 is also responsible for HARQ operations, retransmission of lost packets, and signaling to the UE 650.

The transmit processor 616 of the eNodeB 610 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 642 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each of the receivers 654RX receives a signal through its respective antenna 652. Each of the receivers 654RX recovers information modulated onto an RF carrier and provides the information to the receiver (RX) processor 656. The receive processor 656 implements various signal processing functions of the L1 layer. The receive processor 656 performs spatial processing on the information to recover any spatial streams destined for the UE 650. If multiple spatial streams are destined for the UE 650, they may be combined by the receive processor 656 into a single OFDM symbol stream. The receive processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 672. The soft decisions are then decoded and deinterleaved to recover the data and control signals that were originally transmitted by the eNodeB 610 on the physical channel. The data and control signals are then provided to the controller/processor 660 of the UE 650.

The controller/processor 660 implements the L2 layer. The controller/processor 660 can be associated with a memory 662 that stores program codes and data. The memory 662 may be referred to as a computer-readable medium. In the uplink, the controller/processor 660 provides demultiplexing between transport and logical channels, packet reassembly, deciphering, header decompression, control signal processing to recover upper layer packets from the core network. The upper layer packets are then provided to a data sink 658, which represents all the protocol layers above the L2 layer. Various control signals may also be provided to the data sink 658 for L3 processing. The controller/processor 660 is also responsible for error detection using an acknowledgement (ACK) and/or negative acknowledgement (NACK) protocol to support HARQ operations.

In the uplink, a data source 664 is used to provide upper layer packets to the controller/processor 660. The data source 664 represents all protocol layers above the L2 layer. Similar to the functionality described in connection with the downlink transmission by the eNodeB 610, the controller/processor 660 implements the L2 layer for the user plane and the control plane by providing header compression, ciphering, packet segmentation and reordering, and multiplexing between logical and transport channels based on radio resource allocations by the eNodeB 610. The controller/processor 660 is also responsible for HARQ operations, retransmission of lost packets, and signaling to the eNodeB 610.

Channel estimates derived by a channel estimator 672 from a reference signal or feedback transmitted by the eNodeB 610 may be used by the transmit processor 670 to select the appropriate coding and modulation schemes, and to facilitate spatial processing. The spatial streams generated by the transmit processor 670 are provided to different antenna 652 via separate transmitters 654TX. Each of the transmitters 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a receive processor 640. The receive processor 640 of the eNodeB may implement the L1 layer.

The controller/processor 630 implements the L2 layer. The controller/processor 630 can be associated with a memory 632 that stores program codes and data. The memory 632 may be referred to as a computer-readable medium. In the uplink, the controller/processor 630 provides demultiplexing between transport and logical channels, packet reassembly, deciphering, header decompression, control signal processing to recover upper layer packets from the UE 650. Upper layer packets from the controller/processor 630 may be provided to the core network. The controller/processor 630 is also responsible for error detection using an ACK and/or NACK protocol to support HARQ operations.

The controller/processor 630 and the controller/processor 660 may direct the operation at the eNodeB 610 and the UE 650, respectively. The controller/processor 630 and/or other processors and modules at the eNodeB 610 may perform or direct the execution of various processes for the techniques described herein. The controller/processor 660 and/or other processors and modules at the UE 650 may also perform or direct the execution of the functional blocks illustrated in use in the methods flow charts of FIGS. 8 and 10, and/or other processes for the techniques described herein. The memory 632 and the memory 662 may store data and program codes for the eNodeB 610 and the UE 650, respectively.

Enhanced inter-cell interference coordination (eICIC) is a process in which base stations communicate with each other to yield some resources for enabling control and data transmissions between a user equipment (UE) and a serving evolved Node B (eNodeB). When a network supports eICIC, the eNodeBs negotiate with each other for coordinating resources to reduce and/or eliminate interference by the interfering cell giving up some of its resources. That is, a UE can access a serving cell, even with severe interference, by using the resources yielded by the interfering cell.

For a UE that supports eICIC, the existing criteria for analyzing radio link failure (RLF) conditions may not satisfactorily address the conditions of the coordinating cells. For example, the UE may lie in a region with severe interference. The interference, however, is coordinated between base stations by the interfering cell giving up part of its resources. In this scenario, the UE measurement of a signal to noise ratio (SNR) (e.g., based on a decoding error rate) of the PDCCH may vary considerably, depending on whether resources were yielded by the interfering cell. When the UE measures the signal to noise ratio of the PDCCH for resources that were not yielded by the interfering cell, the UE can erroneously declare radio link failure (RLF) due to high interference. That is, although the UE could access the serving cell using the resources yielded by the interfering cell, the UE fails to access the serving cell because the RLF was erroneously declared by the UE.

Figure 7:
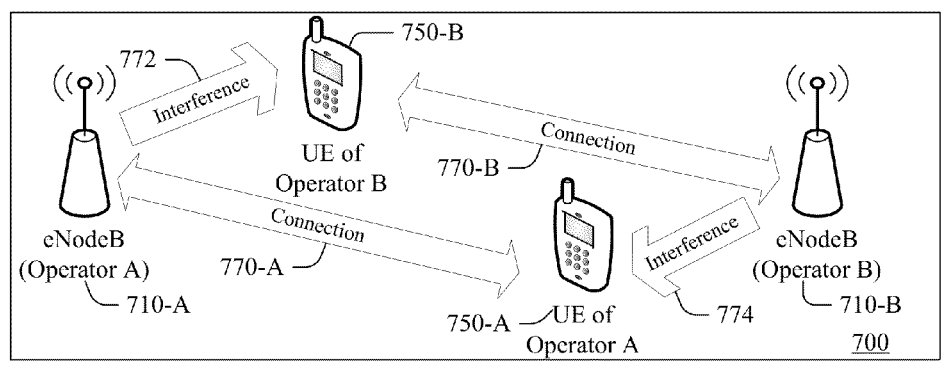
FIG. 7 is a diagram illustrating spectrum sharing between different operators of a same geographic region according to an aspect of the present disclosure.

FIG. 7 is a diagram 700 illustrating spectrum sharing according to an aspect of the disclosure. As described herein, spectrum sharing may refer to authorized shared access (ASA) that allows shared use of spectrum according to, for example, cognitive radio technologies based on an individual authorization model of spectrum rights. The shared spectrum may include a licensed spectrum as well as an unlicensed spectrum. The unlicensed spectrum, which may include unused TV channels, is generally referred to as "white space".

ASA contemplates fair spectrum sharing. For example, where users of another operator are not present, a UE receives service over a full bandwidth (B). Fair spectrum sharing is performed (e.g., B/2 and B/2 for each operator) in areas where users of both operators are present. ASA also allows a customer of one operator to receive service from a corresponding eNodeB, even when the user is closer to an eNodeB of another operator, for example, as shown in FIG. 7.

FIG. 7 illustrates the sharing of a slice of spectrum within a same geographic area, adjacent areas, or partially overlapping areas between different operators. Representatively, a UE 750-A of a first operator ("Operator A") includes a connection 770-A to an eNodeB 710-A of Operator A. Similarly, a UE 750-B of a second operator ("Operator B") includes a connection 770-B to an eNodeB 710-B of Operator B. Unfortunately, in the spectrum sharing scenario of FIG. 7, the UE 750-A and the UE 750-B are each closer to an eNodeB 710-A/710-B of another operator, but receive service from an eNodeB 710-A/710-B of its own operator, which is further away.

As shown in FIG. 7, the UE 750-A of Operator A receives interference 774 from the eNodeB 710-B of Operator B because the UE 750-A is closer to the eNodeB 710-B than the eNodeB 710-A. Similarly, the UE 750-B of Operator B receives interference 772 from the eNodeB 710-A of Operator A because the UE 750-B is closer to the eNodeB 710-A than the eNodeB 710-B. Enhanced inter cell interference coordination (eICIC) provides a general framework for achieving spectrum sharing within the scenario shown in FIG. 7.

eICIC techniques can include the exchange of backhaul messages to arrive at an appropriate split of bandwidth (in a time domain) between operators in a specific area. In addition, interference cancellation at the UE 750-A/750-B may allow operation even when the UE 750-A/750-B is closer to an eNodeB 710-A/710-B where it is not allowed service. Unfortunately, eICIC techniques may not completely enable spectrum sharing between different operators or different radio access technologies (RATs) on a same band. The RATs may include but are not limited to wireless local area networks (WLANs), Bluetooth networks, or other like wireless technologies. For example, the UE 750-A of Operator A may desire to cancel the signals from the eNodeB 710-B of Operator B. Furthermore, cancelling the signal from the eNodeB of another operator may not provide adequate performance.

According to one aspect of the disclosure, the eNodeB 710-A/710-B may signal a list of physical cell identifiers (PCIs) from which the corresponding signals should be cancelled. For example, the eNodeB 710-A may signal a list that includes a PCI corresponding to the eNodeB 710-B of Operator B. In response, the UE 750-A can identify the eNodeB 710-B as belonging to a different operator and cancel the signals from the eNodeB 710-B. Similarly, the eNodeB 710-B may signal a list that includes a physical cell identifier (PCI) corresponding to the eNodeB 710-A of Operator A. In response, the UE 750-B can identify the eNodeB 710-A as belonging to a different operator and cancel the signals from the eNodeB 710-A.

In one configuration, the list of physical cell identifiers (PCIs) may be provided using a blacklist. Blacklists, which are part of existing standards, are not related to cell cancellation functionality. Blacklists generally prevent a UE from seeking service from a cell or prevent the UE from reporting measurements for the cells indicated in the blacklist. According to the present disclosure, a standard blacklist may be revised and/or adapted to provide the list of PCIs for signal cancellation. Alternatively, a cancellation list may be generated, possibly based on a standard blacklist. In this configuration, the UE cancels signals from the base station when the physical cell identifier from the cancellation list indicates that an operator of the base station is different from the operator of the UE.

Figure 8:
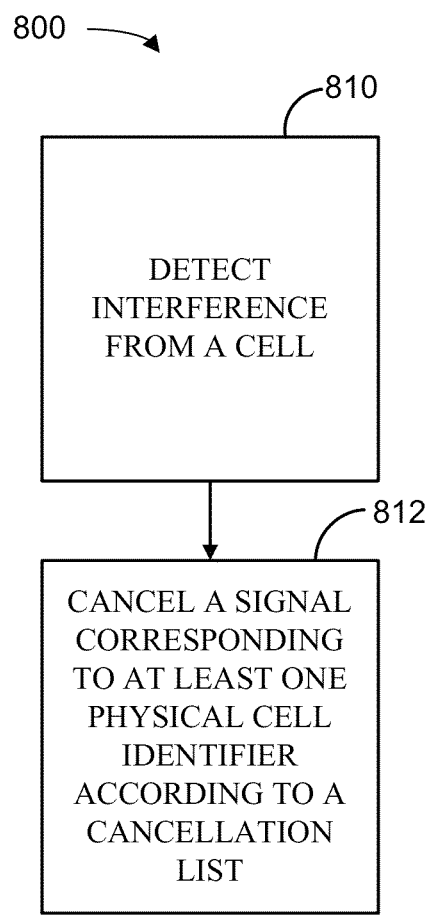
FIG. 8 is a block diagram illustrating a method for cell cancellation to provide improved spectrum sharing according to an aspect of the present disclosure.

FIG. 8 illustrates a method 800 for cell cancellation to provide improved spectrum sharing according to one aspect of the disclosure. In block 810, a UE detects interference from a cell. In one aspect of the disclosure, an interfering base station of the cell resides in a network that supports enhanced interference coordination and cancellation (eICIC). In block 812, the UE cancels a signal from the cell when a physical cell identifier corresponding to the cell is indicated in a received cancellation list. In one aspect of the disclosure, an operator of the cell corresponding to the physical cell identifier is different from an operator of the UE. In this aspect of the disclosure, the cancellation list may be a blacklist, as discussed above.

Figure 9:
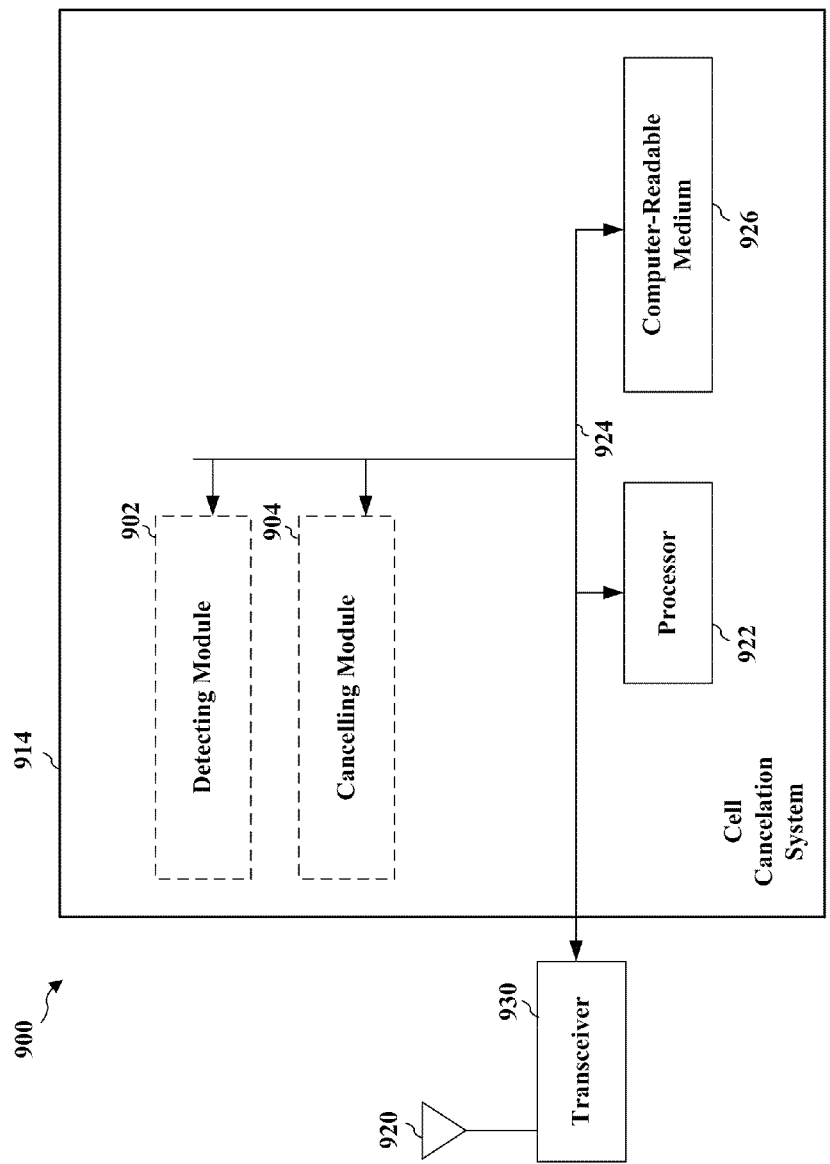
FIG. 9 is a diagram illustrating an example of a hardware implementation for an apparatus employing a cell cancellation system.

FIG. 9 is a diagram illustrating an example of a hardware implementation for an apparatus 900 employing a cell cancellation system 914. The cell cancellation system 914 may be implemented with a bus architecture, represented generally by the bus 924. The bus 924 may include any number of interconnecting buses and bridges depending on the specific application of the cell cancellation system 914 and the overall design constraints. The bus 924 links together various circuits including one or more processors and/or hardware modules, represented by the processor 922, the detecting module 902, the cancelling module 904, and the computer-readable medium 926. The bus 924 may also link various other circuits such as timing sources, peripherals, voltage regulators, and power management circuits, which are well known in the art, and therefore, will not be described any further.

The apparatus includes a cell cancellation system 914 coupled to a transceiver 930. The transceiver 930 is coupled to one or more antennas 920. The transceiver 930 enables communicating with various other apparatus over a transmission medium. The cell cancellation system 914 includes a processor 922 coupled to a computer-readable medium 926. The processor 922 is responsible for general processing, including the execution of software stored on the computer-readable medium 926. The software, when executed by the processor 922, causes the cell cancellation system 914 to perform the various functions described for any particular apparatus. The computer-readable medium 926 may also be used for storing data that is manipulated by the processor 922 when executing software.

The cell cancellation system 914 includes a detecting module 902 for detecting interference from a cell. The cell cancellation system 914 also includes a cancelling module 904 for cancelling a signal from the cell when a physical cell identifier corresponding to the cell is indicated in a cancellation list. The modules may be software modules running in the processor 922, resident/stored in the computer-readable medium 926, one or more hardware modules coupled to the processor 922, or some combination thereof. The cell cancellation system 914 may be a component of the UE 650 and may include the memory 662, and/or the controller/processor 660.

In one configuration, the UE 650 is configured for wireless communication including means for detecting interference from a cell. In one aspect, the detecting means may be the controller/processor 660 and memory 662, the receive processor 656, antenna 652 and/or the receivers 654RX configured to perform the functions recited by the detecting means. The UE 650 is also configured to include a means for cancelling a signal from the cell when a physical cell identifier corresponding to the cell is indicated in a cancellation list. In one aspect, the cancelling means may be the controller/processor 660 and/or memory 662 configured to perform the functions recited by the cancelling means. In another aspect, the aforementioned means may be a module or any apparatus configured to perform the functions recited by the aforementioned means.

In a further aspect of the disclosure, an adaptive radio link failure (RLF) trigger is described for providing improved spectrum sharing. In one configuration, an RLF trigger is expedited when interference is detected from another operator. In particular, an RLF timer and/or a threshold detecting adequate signal conditions may depend on whether interference is from an eNodeB of another operator or a radio access technology (RAT) in a same band. In one aspect of the disclosure, a value of the RLF timer may be selected according to a cell identifier of an interferer (e.g., a PCI of a source of the interference). In a further aspect of the disclosure, a threshold for detecting adequate signal conditions may be increased to expedite the detection and/or the declaration of a radio link failure (RLF).

In one configuration, an RLF trigger (e.g., a timer) is expedited where interference is detected from an eNodeB of another operator according to a received cancellation list. In this configuration, a radio link failure is declared more quickly if the interference is from an eNodeB of another operator (e.g., another radio access technology (RAT)). In this aspect of the disclosure, a reduced RLF timer or a higher threshold for detecting a radio link failure are possible. In one configuration, the RLF timer refers to a duration of time in which the channel conditions remain poor before a radio link failure is triggered. In this configuration, an increased threshold is used to determine acceptable signal strength conditions. Acceptable signal strength conditions may be determined from a signal to noise ratio (SNR), a frame error rate, or the like. In this configuration, regardless of whether a reduced RLF timer or an increased threshold enables detecting of acceptable signal strength conditions, a declaration of a radio link failure is expedited.

Spectrum sharing interference from another operator (e.g., another RAT) may result in a reduced chance of continued service on the current serving cell when a UE has moved too close to a source of interference. In particular, when the source of interference is a different operator or a different radio access technology, interference cancellation, such as eICIC, is insufficient because mitigation from UEs from different operators is limited. Conversely, when the source of interference is from a same operator, the eNodeB of the UE can work with the eNodeB interference source to mitigate interference (e.g., handover to another cell). Although a substantial portion of the interference can be cancelled during spectrum sharing within a same geographic area, interference cancellation can be limited. In particular, when a UE is too close to another operator's UE, the interference can cause a failure. By adjusting an RLF timer and/or a threshold for determining channel conditions, spectrum sharing within a same geographic area is improved.

Figure 10:
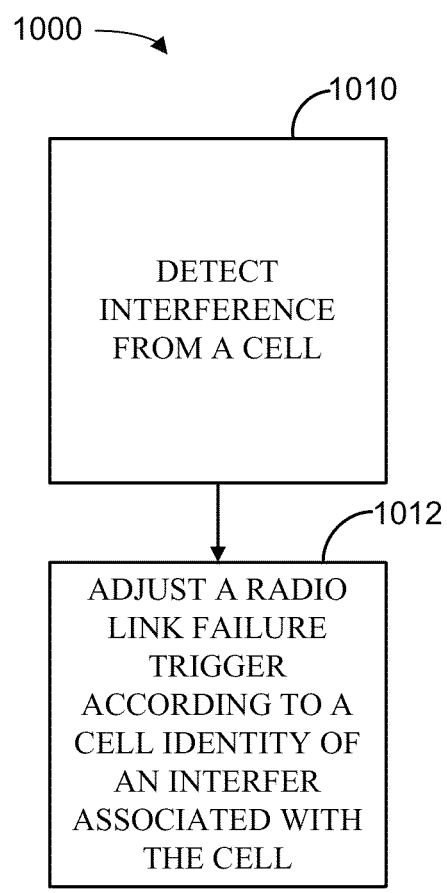
FIG. 10 is a block diagram illustrating a method for an adaptive radio link failure trigger for improved spectrum sharing according to an aspect of the present disclosure.

FIG. 10 illustrates a method 1000 for an adaptive radio link failure (RLF) trigger to provide improved spectrum sharing according to one aspect of the disclosure. In block 1010, a UE detects interference from a cell. In one aspect of the disclosure, an interfering base station of the cell resides in a network that supports enhanced interference coordination and cancellation (eICIC). In block 1012, the UE adjusts a radio link failure (RLF) trigger according to a cell identity of an interferer associated with the cell (e.g., the source of the interference). In one aspect of the disclosure, the RLF trigger is reduced when an operator of the cell is different from an operator of the user equipment. In this aspect of the disclosure, a cancellation list may include physical cell identifiers of cells from other operators within a same geographic region to provide the cell identity of the interferers. In one configuration, the cancellation list may be adapted from a blacklist, as discussed above. In this configuration, the RLF trigger is expedited when a physical cell identifier from the blacklist indicates that the operator of the base station is different from an operator of the UE.

Figure 11:
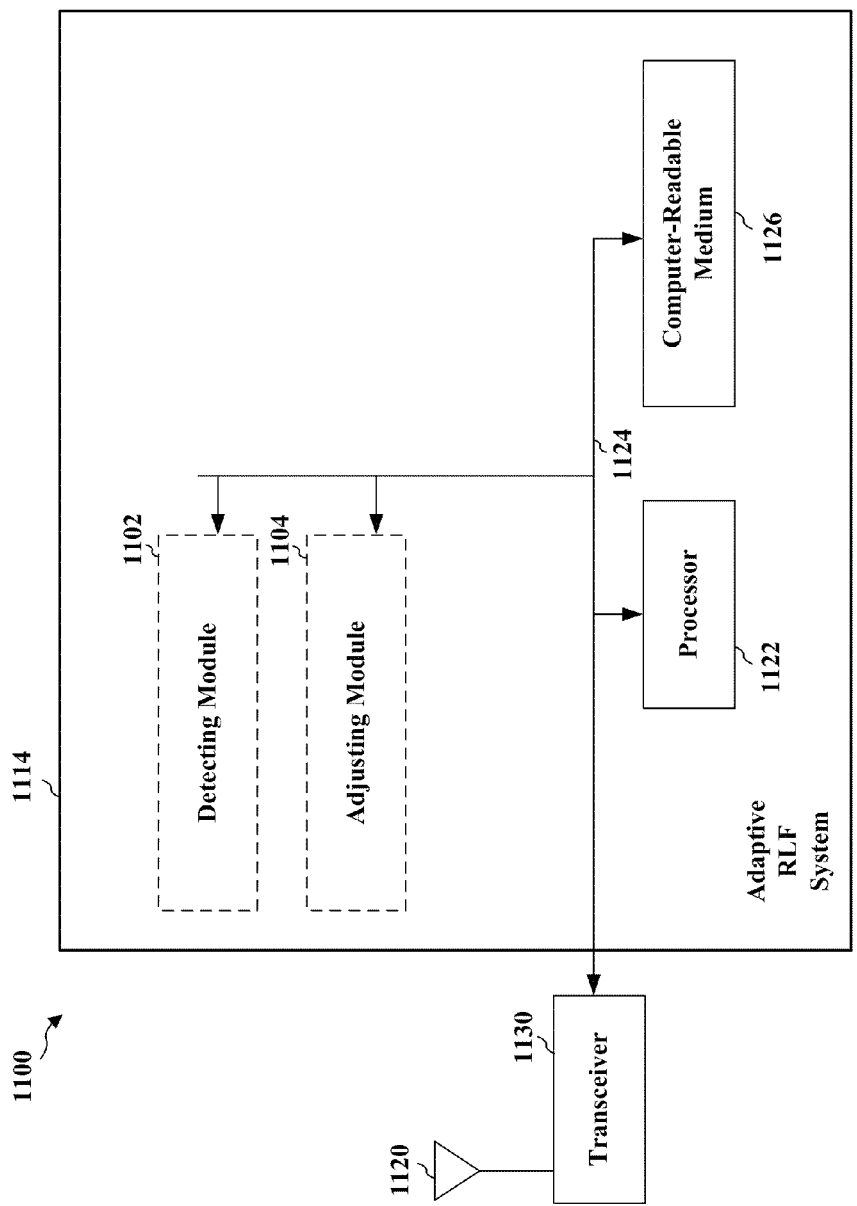
FIG. 11 is a diagram illustrating an example of a hardware implementation for an apparatus employing an adaptive radio link failure system.

FIG. 11 is a diagram illustrating an example of a hardware implementation for an apparatus 1100 employing an adaptive radio link failure system 1114. The adaptive radio link failure system 1114 may be implemented with a bus architecture, represented generally by the bus 1124. The bus 1124 may include any number of interconnecting buses and bridges depending on the specific application of the adaptive radio link failure system 1114 and the overall design constraints. The bus 1124 links together various circuits including one or more processors and/or hardware modules, represented by the processor 1122, the detecting module 1102, the adjusting module 1104, and the computer-readable medium 1126. The bus 1124 may also link various other circuits such as timing sources, peripherals, voltage regulators, and power management circuits, which are well known in the art, and therefore, will not be described any further.

The apparatus includes an adaptive radio link failure system 1114 coupled to a transceiver 1130. The transceiver 1130 is coupled to one or more antennas 1120. The transceiver 1130 enables communicating with various other apparatus over a transmission medium. The adaptive radio link failure system 1114 includes a processor 1122 coupled to a computer-readable medium 1126. The processor 1122 is responsible for general processing, including the execution of software stored on the computer-readable medium 1126. The software, when executed by the processor 1122, causes the adaptive radio link failure system 1114 to perform the various functions described for any particular apparatus. The computer-readable medium 1126 may also be used for storing data that is manipulated by the processor 1122 when executing software.

The adaptive radio link failure system 1114 includes a detecting module 1102 for detecting interference from a cell. The adaptive radio link failure system 1114 also includes a adjusting module 1104 for adjusting a radio link failure trigger according to a cell identity of an interferer. The modules may be software modules running in the processor 1122, resident/stored in the computer-readable medium 1126, one or more hardware modules coupled to the processor 1122, or some combination thereof. The adaptive radio link failure system 1114 may be a component of the UE 650 and may include the memory 662, and/or the controller/processor 660.

In one configuration, the UE 650 is configured for wireless communication including means for detecting interference from a cell. In one aspect, the detecting means may be the controller/processor 660 and memory 662, the receive processor 656, the receivers 654RX, and/or antenna 652 configured to perform the functions recited by the detecting means. The UE 650 is also configured to include a means for adjusting a radio link failure trigger according to a cell identity of an interferer (e.g., source of interference). In one aspect, the adjusting means may be the controller/processor 660 and/or memory 662 configured to perform the functions recited by the adjusting means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
   detecting, by a user equipment, interference from an interferer comprising a first base station of a first operator; and
   cancelling a signal from the interferer when a physical cell identifier of the first base station is indicated in a cancellation list to identify the first operator as different from a second operator of a second base station that provides service to the user equipment, the cancellation list being based on a blacklist that is specified to prevent the user equipment from requesting service from or reporting measurements to each base station in the blacklist.

2. The method of claim 1,
   in which the cancelling includes cancelling the signal from the first base station when the physical cell identifier corresponding to the first base station is identified from the blacklist.

3. A method of wireless communication, comprising:
   detecting, by a user equipment, interference from an interferer comprising a first base station of a first operator;
   adjusting a radio link failure trigger according to a cell identity of the first base station; and
   expediting the radio link failure trigger when a physical cell identifier from a cancellation list indicates that the first operator of the interferer is different from a second operator of a second base station that provides service to the user equipment, the cancellation list being based on a blacklist that is specified to prevent the user equipment from requesting service from or reporting measurements to each base station in the blacklist.

4. The method of claim 3, in which the adjusting includes expediting the radio link failure trigger when the interferer is another radio access technology.

5. The method of claim 3, further comprising:
   cancelling a signal corresponding to at least one physical cell identifier according to the cancellation list, in which the first operator corresponding to the at least one physical cell identifier is different from the second operator of the user equipment; and
   in which the adjusting includes expediting the radio link failure trigger when interference from the first base station of the first operator is greater than a predetermined level.

6. The method of claim 3, further comprising selecting a value for a radio link failure timer according to the interferer.

7. The method of claim 3, in which the interferer includes one of:
   the first base station of the first operator different from the second operator of the user equipment; and
   a radio access technology different from a radio access technology of the user equipment.

8. The method of claim 3, in which the adjusting includes expediting the radio link failure trigger according to a signal strength threshold.

9. An apparatus for wireless communication, comprising:
   a memory; and
   at least one processor coupled to the memory and configured:
   to detect interference, by a user equipment from an interferer comprising a first base station of a first operator; and
   to cancel a signal from the interferer when a physical cell identifier of the first base station is indicated in a cancellation list to identify the first operator as different from a second operator of a second base station that provides service to the user equipment, the cancellation list being based on a blacklist that is specified to prevent the user equipment from requesting service from or reporting measurements to each base station in the blacklist.

10. The apparatus of claim 9, in which the at least one processor is further configured to cancel the signal by cancelling the signal from the first base station when the physical cell identifier corresponding to the first base station is identified from the blacklist.

11. A non-transitory computer-readable medium having program code recorded thereon, the program code comprising:

program code to detect interference, by a user equipment, from an interferer comprising a first base station of a first operator; and program code to cancel a signal from the interferer when a physical cell identifier of the first base station is indicated in a cancellation list to identify the first operator as different from a second operator of a second base station that provides service to the user equipment, the cancellation list being based on a blacklist that is specified to prevent the user equipment from requesting service from or reporting measurements to each base station in the blacklist.

12. The computer program product of claim 11, in which the program code to cancel comprises program code to cancel the signal from the first base station when the physical cell identifier corresponding to the first base station is identified from the blacklist.

13. An apparatus for wireless communication, comprising:
a memory; and
at least one processor coupled to the memory and configured:
to detect interference, by a user equipment, from an interferer comprising a first base station of a first operator;
to adjust a radio link failure trigger according to a cell identity of the first base station; and
to expedite the radio link failure trigger when a physical cell identifier from a cancellation list indicates that the first operator is different from a second operator providing services to the user equipment, the cancellation list being based on a blacklist that is specified to prevent the user equipment from requesting service from or reporting measurements to each base station in the blacklist.

14. A non-transitory computer-readable medium having program code recorded thereon, the non-transitory program code comprising:

program code to detect interference, by a user equipment, from an interferer comprising a first base station of a first operator;

program code to adjust a radio link failure trigger according to a cell identity of the first base station; and program code to expedite the radio link failure trigger when a physical cell identifier from a cancellation list indicates that the first operator of the interferer is different from a second operator providing service to the user equipment, the cancellation list being based on a blacklist that is specified to prevent the user equipment from requesting service from or reporting measurements to each base station in the blacklist.

\* \* \* \* \*